May 25, 1943.   R. F. E. STEGEMAN   2,319,888
OPHTHALMIC INSTRUMENT
Filed Nov. 6, 1941
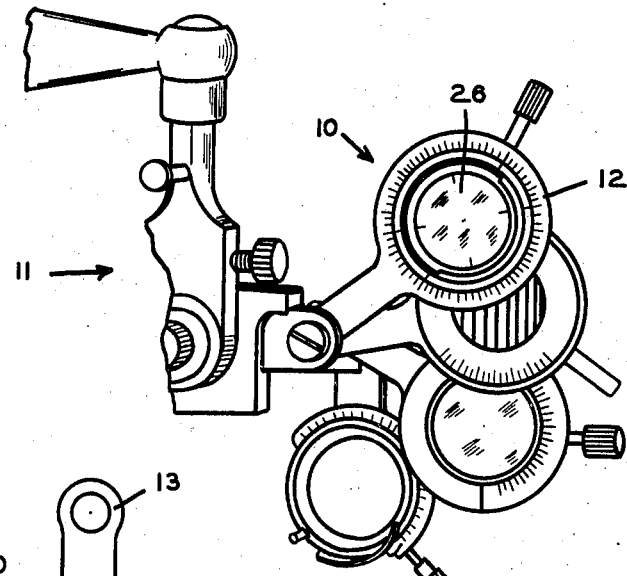
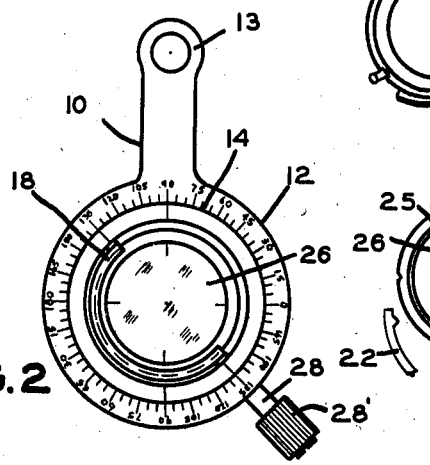
FIG. 2
FIG. 6
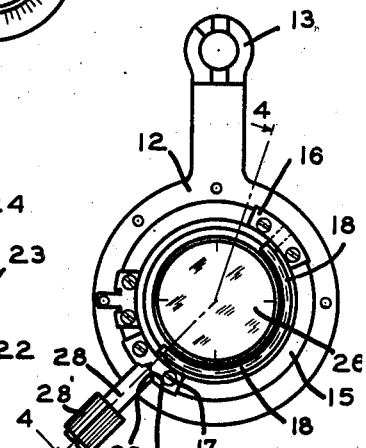
FIG. 3
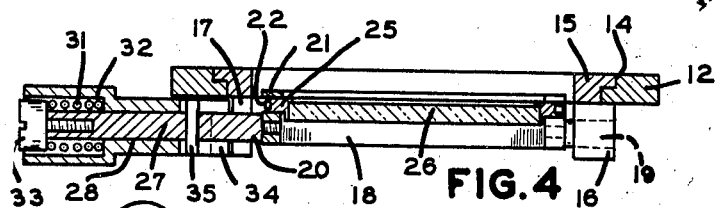
FIG. 4
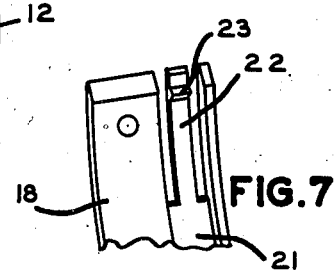
FIG. 7
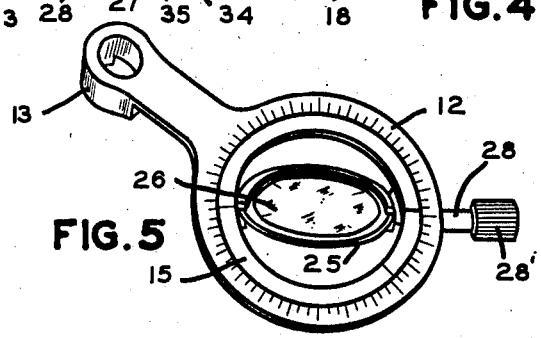
FIG. 5
RAYMOND F. E. STEGEMAN
INVENTOR
BY *J. A. Ellestad*
ATTORNEY Patented May 25, 1943

2,319,888

UNITED STATES PATENT OFFICE 2,319,888

OPHTHALMIC INSTRUMENT

Raymond F. E. Stegeman, Rochester, N. Y., assignor to Bausch & Lomb Optical Company, Rochester, N. Y., a corporation of New York Application November 6, 1941, Serial No. 418,025

4 Claims. (Cl. 88—20)

This invention relates to ophthalmic instruments and more particularly it has reference to a device which is used for making the so-called "cross cylinder test" during an eye examination, such as disclosed in United States Patent No. 1,873,356, for example.

One of the objects of my invention is to provide an improved cross cylinder device which will be simple in structure yet efficient in operation. A further object is to provide a cross cylinder device having means permitting the quick and easy interchange of the lens in the device. These and other objects and advantages reside in certain novel features of construction, arrangement and combination of parts as will hereinafter be more fully described and pointed out in the appended claims.

Referring to the drawing:

Fig. 1 is a fragmentary view of a phorometer having a cross cylinder device embodying my invention.

Fig. 2 is a front view of a cross cylinder device embodying my invention.

Fig. 3 is a rear view of same.

Fig. 4 is an enlarged view taken on line 4—4 of Fig. 3.

Fig. 5 is a view showing the relation of the parts when the lens is to be interchanged.

Fig. 6 is a view showing the lens with its mounting and fragmentary parts of the lens cell in separated relation.

Fig. 7 is a fragmentary view of the lens cell.

A preferred embodiment of my invention is disclosed in the drawing wherein 10 indicates, generally, a cross cylinder device which may be attached to an eye testing device such as a phorometer, shown partly at 11 in Fig. 1. The cross cylinder device comprises the plate member 12 which may be rotatably mounted on the phorometer by means of the bearing member 13 carried by the plate 12, as will be understood by those skilled in the art.

The plate 12 has the circular opening 14 in which is rotatably mounted the ring 15 on one face of which are mounted, at diametrically opposite positions, the two bearing members 16 and 17. A semi-circular member 18, having pivots 19 and 20 at its respective ends, is mounted with the pivots cooperating with the bearing members so that the member 18 may be turned about an axis which is substantially parallel to the face of the plate 12. Substantially coextensive and integral with the member 18 is the lens cell 21 which has at its two ends the integral spring tongues 22 carrying lugs 23 adapted to cooperatively engage the notches 24 placed at diametrically opposite positions on mounting 25 carrying the cross cylinder lens 26.

The pivot member 20 carries an integral extension 27 on which is slidably mounted the bushing 28 having the knurled finger-engaging portion 28'. The inner end of bushing 28 has a tapered portion 29 which engages a correspondingly shaped notch 30 in bearing member 17 and is yieldably held therein by coil spring 31 carried in a seat 32 in bushing 28 and retained by screw 33 threaded into extension 27. The forward end of bushing 28 is slotted, as at 34, to receive the pin 35 which is secured to shaft 27.

It will thus be apparent that the lens cell 21 and lens 26 may be rotated by means of the bushing 28. The lens 26 is locked in 180 degree positions by the spring pressed portion 29 which engages the notch 30. By turning the cross cylinder lens 26 through 180 degrees, the axes of the lens are moved 90 degrees. By employing the semi-circular member 18 for rotatably carrying the lens 26, I am able to provide convenient means for interchanging the lens 26 so that the refractionist may selectively use cross cylinder lenses of various powers. The interchange of lenses can readily be accomplished by placing the parts substantially as shown in Fig. 5. This enables the refractionist to grasp the lens 26 and its mount 25, remove it and insert another of different characteristics.

From the foregoing, it will be apparent that I am able to attain the objects of my invention and provide an improved cross cylinder device having means permitting facile interchange of lenses. Various modifications can obviously be made without departing from the spirit of my invention.

I claim:

1. In an ophthalmic instrument, the combination of a plate having an opening, an arcuate member having pivots at its respective ends, said pivots being mounted on bearings carried by said plate on opposite sides of the opening whereby said member may be turned about an axis which is substantially parallel to the face of the plate, a lens cell carried by said member, a mounting carrying a lens and cooperating means on the cell and mounting for detachably holding the lens.

2. An ophthalmic instrument comprising a plate having an opening, a ring rotatably mounted to turn about an axis that is substantially perpendicular to the plane of the plate, a substantially semi-circular member having its respective ends pivotally supported by bearing members secured at diametrically opposite points on said ring, means for rotating said member about an axis which is substantially parallel to the plane of said plate, said member having a substantially coextensive peripheral groove, a mounting carrying a lens and cooperating means on the member and mounting for releasably holding the mounting and lens in said groove.

3. An ophthalmic device comprising a plate having an opening, a ring rotatably mounted in the opening for rotation about an axis which is substantially perpendicular to the plane of the plate, a semi-circular member having its respective ends pivotally mounted on bearings carried at two diametrically opposite points on the ring, said member being mounted to turn about an axis which is substantially parallel to the plane of the ring, said member having a peripheral groove, a cross cylinder lens detachably held in said groove and means for rotating said member to vary the location of the axes of the lens, the rotation of said member also affording access to the groove to permit insertion and withdrawal of the lens through said opening.

4. In an ophthalmic instrument, the combination of a plate having an opening, an arcuate member having pivots at its respective ends, said pivots being mounted on bearings carried by said plate on opposite sides of the opening whereby said member may be turned about an axis which is substantially parallel to the face of the plate, a lens cell carried by said member, a mounting carrying a lens and cooperating means on the cell and mounting for detachably holding the mounting and lens, said means including spring pressed projections which cooperate with notches formed in said mounting.

RAYMOND F. E. STEGEMAN.